(No Model.) 2 Sheets—Sheet 1.
M. F. BROWN.
COMBINED SPICE RECEPTACLE AND FLOUR BIN.
No. 466,394. Patented Jan. 5, 1892.
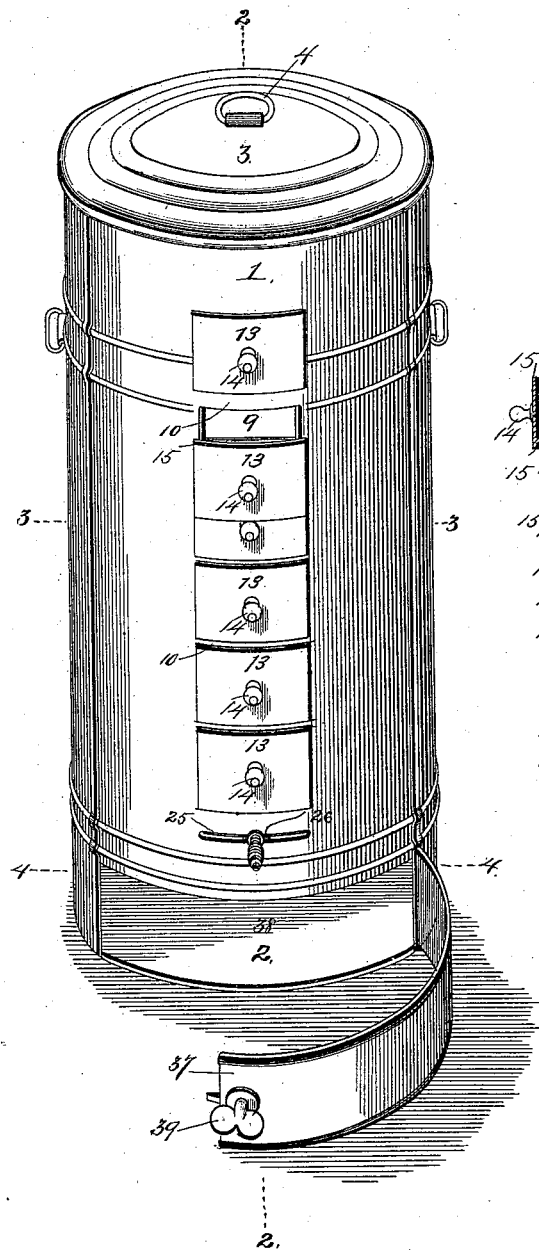
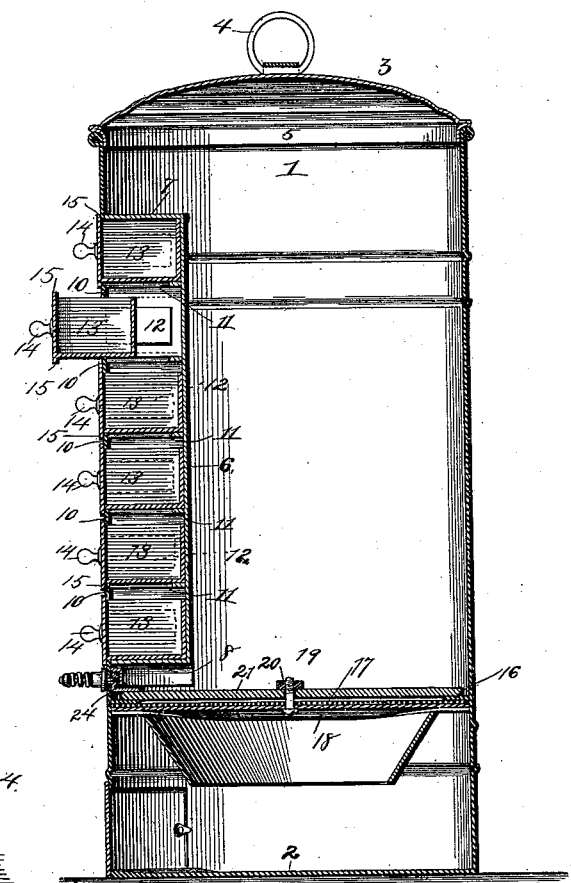
Witnesses,
G. W. Thorpe
H. C. Johnson
Inventor,
Millard F. Brown.
by Higdon & Higdon
Attorneys.

(No Model.) 2 Sheets—Sheet 2.

M. F. BROWN.
COMBINED SPICE RECEPTACLE AND FLOUR BIN.

No. 466,394. Patented Jan. 5, 1892.

Witnesses
Inventor
Millard F. Brown,
by
Higdon & Higdon,
Attorneys.

THE NORRIS PETERS CO., PHOTO-LITHO., WASHINGTON, D. C.

UNITED STATES PATENT OFFICE.

MILLARD F. BROWN, OF LOUISVILLE, KENTUCKY.

COMBINED SPICE-RECEPTACLE AND FLOUR-BIN.

SPECIFICATION forming part of Letters Patent No. 466,394, dated January 5, 1892.

Application filed April 6, 1891. Serial No. 387,798. (No model.)

*To all whom it may concern:*

Be it known that I, MILLARD F. BROWN, of Louisville, Jefferson county, Kentucky, have invented certain new and useful Improvements in a Combined Spice-Receptacle and Flour-Bin, of which the following is a full, clear, and exact description, reference being had to the accompanying drawings, forming a part hereof.
My invention relates to receptacles for holding and delivering flour, meal, and similar substances, and also for containing spices, salt, and other commodities used in the culinary art; and the objects of my invention are to produce a simple, compact, durable, and comparatively inexpensive structure which shall serve as a convenient receptacle for the spices and similar articles, and also for the flour, meal, and like substances, and by means of which the flour, meal, or similar substances can be readily removed in quantities desired without exposing the entire mass to handling or to contact with the external atmosphere; furthermore, to produce a structure by means of which the flour, meal, or like article can be readily sifted and aerated while being taken from the bin or receptacle.

To the above purposes my invention consists in certain peculiar and novel features of construction and arrangement, as hereinafter described and claimed.

In order that my invention may be fully understood, I will proceed to describe it with reference to the accompanying drawings, in which—

Figure 3:
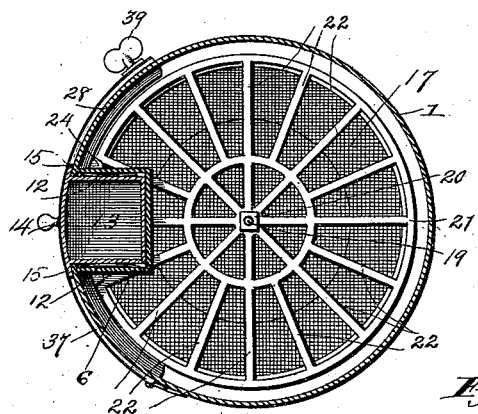
Figure 4:
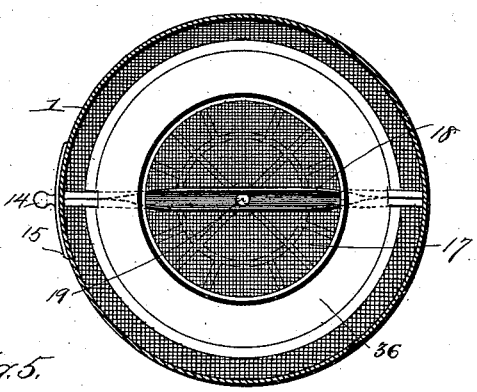
Figure 5:
Figure 6:
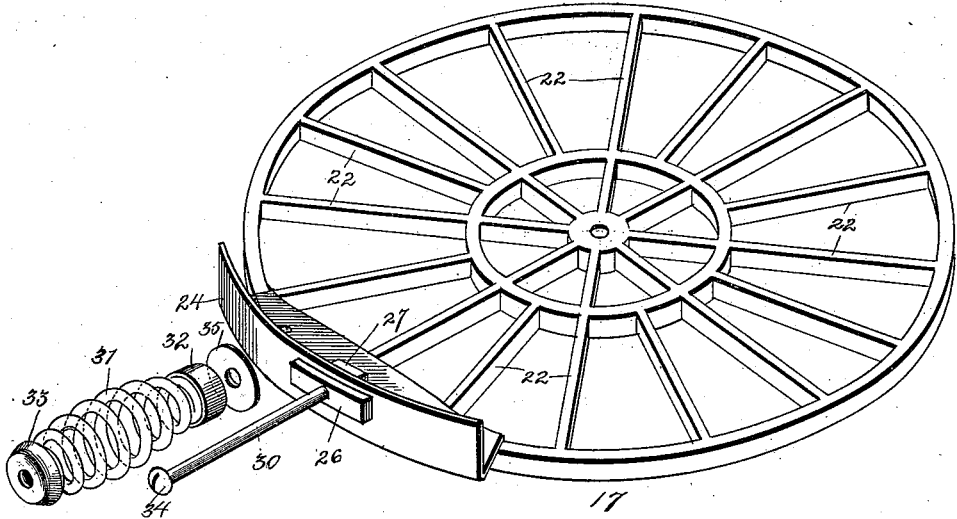

Figure 1 is a perspective view of a combined spice-receptacle and flour-bin embodying my invention. Fig. 2 is a transverse vertical section of the same on the line 2 2 of Fig. 1. Fig. 3 is a horizontal section of the same on the line 3 3 of Fig. 1. Fig. 4 is a horizontal section of the same on the line 4 4 of Fig. 1. Fig. 5 is a detached perspective view of the stationary guide and guard for the rotating stirrer. Fig. 6 is a detached perspective view of the stirrer and its attachments, hereinafter described.

In the said drawings, 1 designates the main casing of the bin, the said casing being preferably of elongated cylindrical form and being also designed to stand vertically upon its lower end or base. At its lower end this casing 1 is provided with a bottom 2, and the upper end of the casing is closed by a remov-
able top or cover 3. This top or cover 3 is provided with a ring or other suitable handle 4 and at its lower edge with a downwardly-extending flange 5, which when the top or cover is in position fits within and tightly closes the upper end of the casing.

Upon the inner side of the casing 1 and at the front of the same is located an oblong rectangular casing 6, which extends vertically from near the upper end of the casing 1 toward the lower end of the latter. The back and sides of this casing are entirely closed, and the said casing 6 is formed with a closed top 7 and a closed bottom 8. The front of this casing opens into an elongated rectangular slot 9, which extends vertically of the main casing 1, preferably at the front side of the same, and this opening 9 is divided into any desired number of smaller openings by means of transverse bars 10, each of which is preferably integral with the said main casing, or which are each suitably secured thereto at the vertical margins of the opening 9. Upon the inner surface of each side of the casing 6 are secured a number of ledges 11, each of which is of inverted-L shape, and which are arranged in pairs at opposite sides of the casing, extending horizontally inward from the opening 9, each pair of ledges being flush at its upper part with the upper edge of the corresponding cross-piece 10.

Upon the inner surface of each side of the vertical casing 6 are secured a number of spring-plates 12, each of which is preferably of rectangular form, and which are disposed in oppositely-arranged pairs above the ledge 11, above described.

13 designates a number of drawers of rectangular form and open at the top, which are arranged to slide inward and outward upon the ledge 11 and upon the upper sides of the cross-bars 10. The front end of each of these drawers is provided with a suitable knob or handle 14, and the said front of each drawer preferably extends downwardly below the bottom of the drawer, so as to form a lip or flange 15, as shown. These drawers are designed to contain various kinds of spices, and also salt and other articles used in the culinary art, and each of said drawers is preferably provided on its front with an inscription indicating the particular kind of article which it contains.

In the lower part of the main casing 1, at a suitable distance above the lower end or bottom of said casing, are secured two rings 16, which extend the one below the other horizontally within the casing 1, and which are soldered or otherwise suitably secured to the inner surface of the casing. Between these two rings is secured the edge of a sieve or mesh of wire or other fabric 17, which thus extends horizontally across the lower part of the casing 1. Beneath the sieve or meshing 17 is located a cross-bar 18, the ends of which are secured beneath the lower ring 16, and which thus extend horizontally beneath the sieve or meshing 17, preferably from front to back of the casing 1. Through the middle of this cross-bar 18 is inserted upwardly a bolt 19, which also extends upward through the center of the sieve or meshing 17, and the upper part of which is screw-threaded to receive a nut 20, which binds upon the upper side of the stirrer 21. This stirrer 21 is of circular form in marginal contour and is provided with a number of radial arms 22. The said stirrer is located immediately above the mesh or sieve 17, and the bolt 19 above referred to passes upward through the center of the stirrer, the nut 20 being secured upon the upper end of the bolt and binding upon the upper side of the stirrer, as just stated, so as to retain the latter in position. Upon the front part of this stirrer is formed a segmental guard 24, which is of L shape in cross-section, and the inner edge of the horizontal portion of which is secured, preferably, to the front part of the rim of the stirrer 21. The vertical part of this guard extends across and closes a horizontal slot 25, which is formed, preferably, in the front part of the casing 1 and at the lower part thereof. At the middle of the vertical part of the guard 24, on the outer side thereof, is formed the enlargement or boss 26, which projects through the slot 25, and upon the inner side of said vertical part of the guide, directly opposite the enlargement 26, is found a second enlargement 27, the purposes of these enlargements being hereinafter described.

Upon the inner surface of the casing 1 is secured a downwardly-extending guide 28, the upper part of which is formed with a flange 29, by which the said guide 28 is soldered or otherwise secured to the casing. This guide 28 depends downward over the guard 24 and overlies the inner side of the same. It will be seen that the guide insures the proper movement of the stirrer and at the same time the guard, by closing the slot 25, prevents the flour or meal from escaping out of said slot.

30 designates the screw or bolt, the inner end of which is threaded into and through the enlargements 26 and 27, the said enlargements affording a strong connection between the screw and the stirrer which it operates. This screw is surrounded by a spiral spring 31, which constitutes a handle by means of which the stirrer is moved, and at its inner end this spring is surrounded by a collar 32, while the outer end of the spring is surrounded by a cap 33. The collar 32 embraces the inner end of the screw 30, while the cap 33 surrounds the outer portion of the said screw. The cap 33 abuts against the head 34 of the screw 30, while the collar 32 abuts against a washer 35, which embraces the inner part of said screw and also abuts against the enlargement 26 of the stirrer 21. Thus it will be seen that there is no friction between the washer 35 and the outer surface of the casing 1, but that the thrust of the spring-handle is borne by the enlargement 26.

A frusto-conical deflector 36 is attached at its upper edge beneath the lower ring 16 and cross-bar 18, and its interior walls depend downwardly and inwardly toward the bottom of the casing 1. A door 37 is hinged at one end to one edge of an opening 38 in the lower part of the front of the casing 1 and is provided at its opposite edge with a button 39, which retains the door in closed position when desired. It is to be observed that the cross-bar 18 is of inverted-U form in cross-section, and by virtue of this form the flour or meal or other article while being sifted falls easily over the cross-bar and does not clog thereon.

From the above description it will be seen that when it is desired to obtain a quantity of flour from the bin the door 37 is opened and a pan or other receptacle is placed in the space beneath the sieve 17. The stirrer is now turned back and forth by the handle 31, aerating the flour and sifting it through the sieve 17, while the deflector 36 causes all of the flour to fall directly into the receptacle. The guard prevents all waste of the flour and also prevents the entrance of vermin into the flour. The entire device is simple, compact, and durable in construction, is easily operated, and is both convenient and inexpensive in construction.

Having thus described my invention, what I claim as new therein, and desire to secure by Letters Patent, is—

An improved bin for flour, &c., comprising a casing having a sieve in its lower part, a stirrer located above the sieve and having a guard at its rim, a slot in the lower part of the casing, a guide on the inner surface of the casing overlying the guard, enlargements formed on the rim of the stirrer, one of said enlargements projecting through the slot of the casing, a screw threaded into said enlargements, a spring-handle surrounding said screw, and a washer receiving the thrust of the screw and abutting against the outer enlargement, substantially as set forth.

In testimony whereof I affix my signature in presence of two witnesses.

MILLARD F. BROWN.

Witnesses:
JNO. L. CONDRON,
H. E. PRICE.